March 2, 1954  J. VILLEMÉJANE  2,670,597
ROTATING JET MOTOR WITH REGULATION POWER OUTPUT
Filed Oct. 9, 1947  3 Sheets-Sheet 1

Inventor
J. Villeméjane
By Glascock Downing Seebold
Attys

March 2, 1954

J. VILLEMÉJANE 2,670,597

ROTATING JET MOTOR WITH REGULATION POWER OUTPUT

Filed Oct. 9, 1947

Inventor
J. Villeméjane

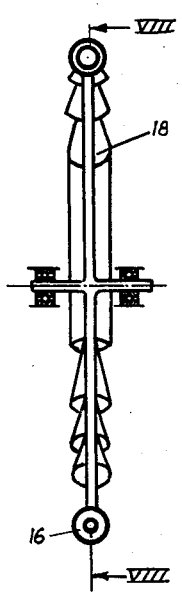
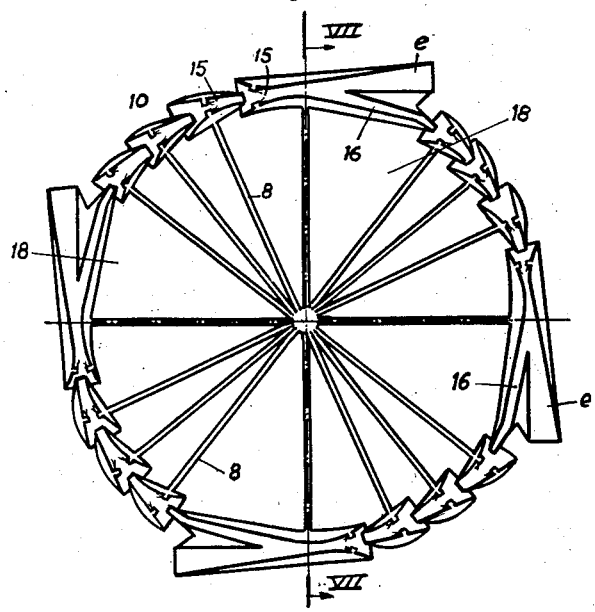
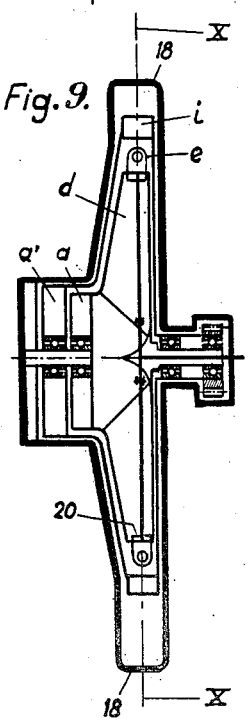
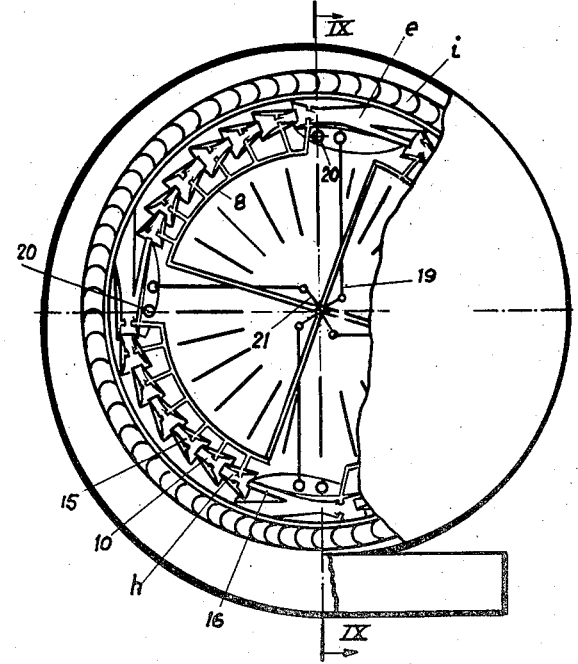

Patented Mar. 2, 1954

2,670,597

UNITED STATES PATENT OFFICE 2,670,597

ROTATING JET MOTOR WITH REGULATION OF POWER OUTPUT

Jacques Villeméjane, Paris, France

Application October 9, 1947, Serial No. 778,781

Claims priority, application France October 14, 1946

6 Claims. (Cl. 60—39.2)

This invention relates to heat engines of the type incorporating a series of Venturi-shaped chambers wherein combustion gases operate and are ejected by means of a final nozzle either into the outer atmosphere or into the blades of a turbine or reactor so as to produce motive force.

The main object of my invention consists in increasing the mass of combustion gases in each successive chamber, and consequently their velocity. With this object in view, the device according to my invention comprises a succession of Venturi-shaped combustion chambers, each having an inlet of atmospheric air and a burner supplied with fuel, an ejection nozzle being located at the outlet of the final combustion chamber, which nozzle ejects the gases into the surrounding atmosphere or into a turbine or reactor.

In order to still further increase the mass of combustion gases, a portion of the gases passing out of the ejection nozzle is recycled into one of the combustion chambers, preferably the first of said chambers.

In the accompanying drawings which show diagrammatically and by way of example, several embodiments of my invention:

Figure 7 is an axial section through line VII—VII of Figure 8, of an engine provided with combustion chambers tangentially arranged with reference to a rotary disc, and Fig. 8 is a cross section through line VIII—VIII of Fig. 7.

Fig. 9 is an axial section through line IX—IX of Fig. 10, of an engine the tangentially arranged combustion chambers of which open into a turbine blading, and Fig. 10 is a part sectional view through line X—X of Fig. 9.

Figure 1:
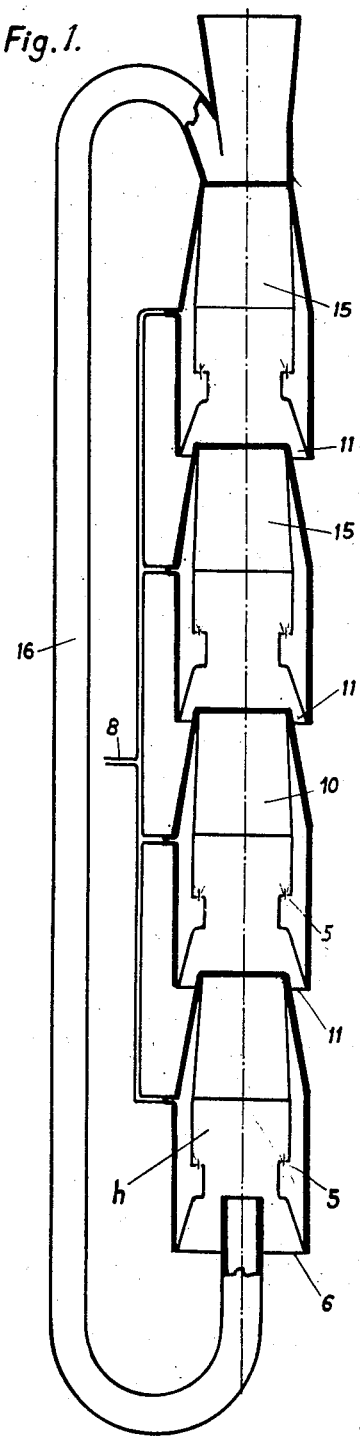
Fig. 1 is an axial section of a plurality of Venturi-shaped combustion chambers arranged in series to form part of a heat engine.

Turning to Fig. 1, the first combustion chamber $h$ of a series of chambers forming part of the heat engine is provided with an air inlet 6 and the following combustion chambers 10, 15, 15 are likewise provided with air inlets 11, 11, 11. Each combustion chamber has a double walled jacket 2, 3 within which fuel is fed by a common duct 8 to supply burners 5, 5 inside each chamber. An ejection nozzle $e$ is placed at the outlet of the final combustion chamber 15.

The fuel burning in each burner 5 sucks in atmospheric air through the corresponding inlet 6, 11, 11. The jacket walls 2, 3 of the combustion chambers $h$, 10, 15, 15 are cooled by the fresh incoming fuel, and the heat produced by the combustion gases in each chamber causes vaporisation of the fuel thus supplied to the burners through the duct 8. The burnt gases from all the chambers are exhausted through the nozzle $e$. The gases issuing from the nozzle $e$ will provide the propulsion of a vehicle through reaction or they may operate a turbine as disclosed hereinafter. On starting, when still cold, the engine may be heated by any known means, not illustrated.

The velocity of the gases increases each time they pass through the outlet of any of the combustion chambers $h$, 10 and 15. If M be the mass of gases and V their velocity at the outlet end of chamber $h$, the mass of gases in chamber 10 will be increased by that of the air entering at 11 and will amount to 2M, for instance, at the outlet of chamber 10, and their velocity will be 2V. Through the arrangement of a third Venturi tube 15 after chamber 10, the mass will become 4M and the velocity 4V, and so forth.

In order to still further increase the mass and velocity of the gases, a portion of the gases may be recycled from the outlet end of the final combustion chamber 15 and for this purpose, a pipe 16 will feed said portion of gases back into the first combustion chamber $h$ or into any of the other chambers 10, 15, 15.

Figure 2:
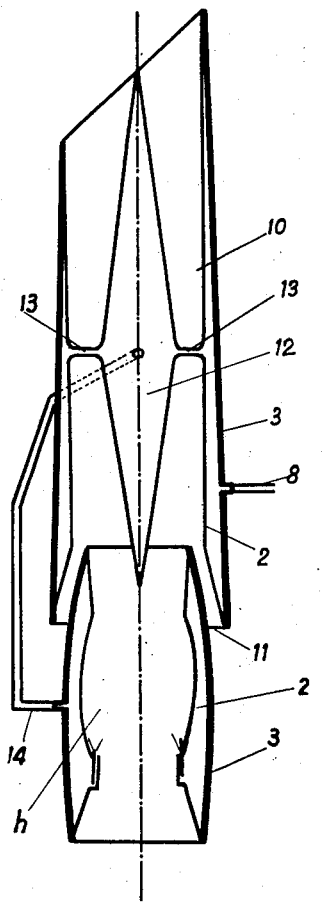
Fig. 2 is an axial section illustrating a similar series of chambers, one of which is provided with central mixing means.

In Fig. 2, the Venturi chamber or tube 10 which forms the second combustion chamber is provided with a central core 12 forcing the flame outwardly to commingle with the air entering at 11. Said core 12 may be hollow. In such a case, the fuel supplied by the pipe 8 to the jacket between the walls 2, 3 of chamber 10 and heated therein is fed through the channels 13, 13 to the chamber inside the core 12 and thence through the pipe 14 to the jacket between the walls 2, 3 of the preceding chamber $h$. The heat absorbed by the gases cooling the core 12 produces increased pressure and velocity for the gases flowing out of the core.

Figure 3:
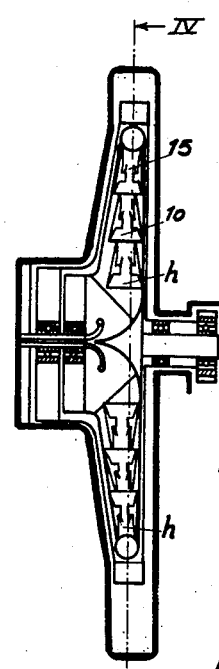
Figure 3 is an axial section through line III—III of Figure 4, of a turbine having a plurality of series of chambers of the type illustrated in Fig. 1, said series being arranged radially.
Figure 4:
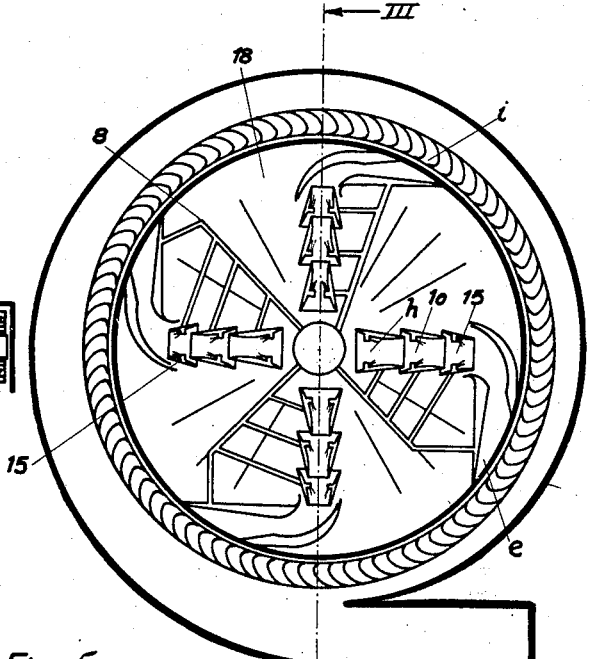
Fig. 4 is a cross-section through line IV—IV of Figure 3.

The successive Venturi chambers $h$, 10 and 15, 15 which constitute thermal accelerators may be disposed along radial lines, as in Figures 3 and 4, from the center to the periphery of a plate keyed to the engine shaft. The gases are caused to impinge on the blades of a turbine $i$ rotating in a direction opposed to that of the shaft by the nozzles $e$ rotating with and fed by the Venturi tubes $h$, 10, 15, 15 in a direction opposed to that of said turbine. Centrifugal action is thus added to the suction exerted by the successive Venturi chambers to suck air out of the latter into the turbine.

Figure 5:
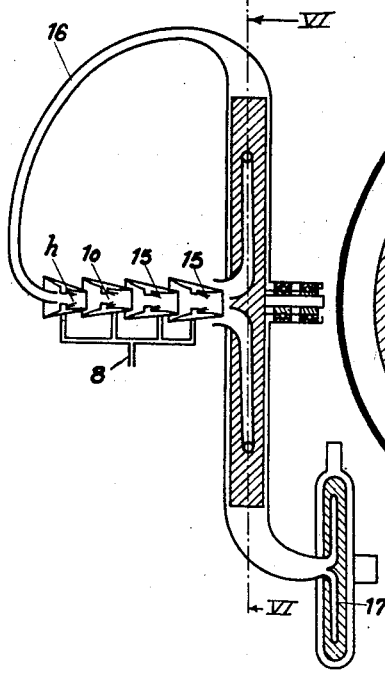
Fig. 5 is an axial section through line V—V of Fig. 6, of a turbine having a single series of axially arranged chambers according to Fig. 1.
Figure 6:
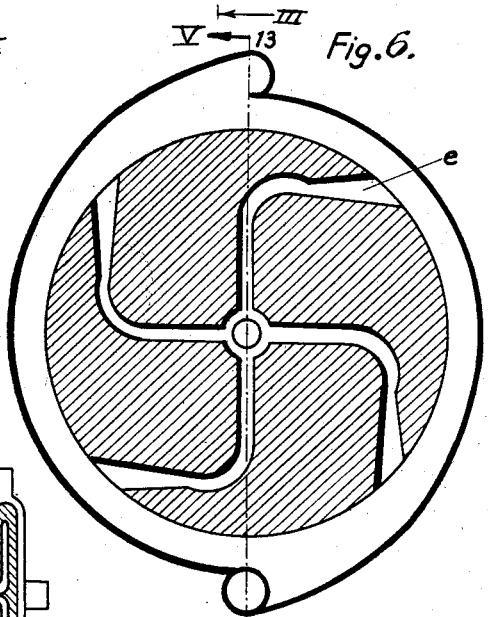
Figure 6 is a cross section through line VI—VI of Figure 5.

In the case illustrated in Figs. 5 and 6, a single series of combustion chambers is laid along the axis of the engine. A portion of the gases may be recycled through the pipe 16 from the peripheral exhaust nozzle e into the inlet of the first chamber h, and the remainder will be sent into the turbine 17 for driving same.

As shown in Figs. 7 and 8 one or more series of Venturi tubes or chambers may be arranged on the plate 18, at the periphery thereof in a direction tangential to the direction of rotation. A shunt pipe 16 from the final outlet nozzle for the burnt gases returns a portion of the latter back to the inlet of the first combustion chamber as in the case illustrated in Fig. 1.

In Figs. 9 and 10, several series of Venturi-shaped combustion chambers are disposed in succession tangentially to the periphery of a plate d and they project the burnt gases against the blades i of a turbine which rotate in a direction opposed to that of the plate d. In order to vary the angle of impact of the gases on the blades of the turbine rotor i, each of the final nozzles e may be pivotally secured to a spindle 20 and angularly adjusted thereon through a rod 19 operable by a lever 21 mounted on the motor shaft and to which a slight rotation may be imparted round the axis of said shaft by a bar 25 provided with a knob 24 and threadedly carrying a nut 23 adapted to lock the bar 25 in any desired position.

What I claim is:

1. A thermal motor comprising a motor shaft, a rotor mounted on said shaft, a plurality of series of Venturi-shaped combustion chambers carried by said rotor with their respective axes tangential to a circle having its center on the axis of said shaft, said chambers opening directly into one another, each combustion chamber being arranged to feed the next chamber with burnt gases, a burner in each chamber, a supply of fuel to each burner, an air inlet to each chamber, a nozzle at the outlet end of the final combustion chamber of each series, the respective discharge ends of said nozzles being located on a circle coaxial with the first mentioned circle and of greater diameter so that the stream of burnt gases issuing from each of said nozzles is discharged on the outside of the first air inlet of the next series of combustion chambers, and a shunt passage connecting each of said nozzles with the first air inlet of the next series of combustion chambers.

2. A thermal motor comprising a motor shaft, a rotor mounted on said shaft a plurality of series of Venturi-shaped combustion chambers with their respective axes tangential to a circle having its center on the axis of said shaft and located in a plane at right angles to said axis, said chambers opening directly into one another whereby each combustion chamber feeds burnt gases to the next chamber, a burner in each chamber, a supply of fuel to each burner, an air inlet to each chamber, a nozzle at the outlet end of the final combustion chamber of each series, the respective discharge ends of said nozzles being located on a circle coaxial with the first mentioned circle and of greater diameter so that the stream of burnt gases issuing from each of said nozzles is discharged on the outside of the first air inlet of the next series of combustion chambers, and a shunt conduit extending from an intermediate point of each of said nozzles to the air inlet of the first combustion chamber of the next series.

3. In a heat engine, a rotor shaft, a rotor mounted on said shaft, a plurality of series of combustion chambers carried by said rotor, said chambers opening axially into one another to feed one another with the burnt gases evolved therein, a nozzle at the output end of the last chamber of each series adapted to produce a high velocity stream of burnt gases, a jacket surrounding each chamber, means for feeding fuel to the different chamber jackets, burners in each combustion chamber fed with fuel through the corresponding jacket, means for admitting atmospheric air into the inlet end of each chamber, and a turbine rotor journalled concentrically on said rotor on the outside of said series of combustion chambers and including blades adapted to be submitted to the stream of burnt gases passing out of the nozzles of the different series.

4. In a heat engine, a rotor shaft, a rotor mounted on said shaft, a plurality of series of combustion chambers carried by said rotor, said chambers opening axially into one another to feed one another with the burnt gases evolved therein, a nozzle at the output end of the last chamber of each series adapted to produce a high velocity stream of burnt gases, a jacket surrounding each chamber, means for feeding fuel to the different chamber jackets, burners in each combustion chamber fed with fuel through the corresponding jacket, means for admitting atmospheric air into the inlet of each chamber, a turbine rotor journalled concentrically on said first mentioned rotor on the outside of said series of combustion chambers and including blades adapted to be submitted to the streams of burnt gases passing out of the nozzles of the different series, and means for adjusting the angle of the axes of said nozzles with reference to the radii of the first mentioned rotor passing through said nozzles.

5. A motor according to claim 1 in which said series of combustion chambers are mounted on a rotating disc.

6. A thermal motor according to claim 2 further including a turbine rotor journalled on said shaft concentrically on said first mentioned rotor on the outside of said series of combustion chambers and including blades arranged to be submitted to the stream of burnt gases passing out from said nozzles.

JACQUES VILLEMÉJANE.

References Cited in the file of this patent

UNITED STATES PATENTS

| Number | Name | Date |
| --- | --- | --- |
| Re. 22,844 | Traupel | Feb. 18, 1947 |
| 1,003,708 | Coleman | Sept. 19, 1911 |
| 1,146,707 | Holtz | July 13, 1915 |
| 1,291,273 | Tyler | Jan. 14, 1919 |
| 1,802,860 | Zwinkel | Apr. 28, 1931 |
| 1,987,699 | Moore | Jan. 15, 1935 |

FOREIGN PATENTS

| Number | Country | Date |
| --- | --- | --- |
| 522,163 | France | Mar. 22, 1921 |
| 627,121 | France | May 30, 1927 |
| 804,213 | France | July 27, 1936 |
| 807,419 | France | Oct. 19, 1936 |
| 90,784 | Germany | Feb. 15, 1897 |
| 299,420 | Great Britain | May 15, 1930 |
| 263,415 | Italy | Mar. 16, 1929 |